UNITED STATES PATENT OFFICE.

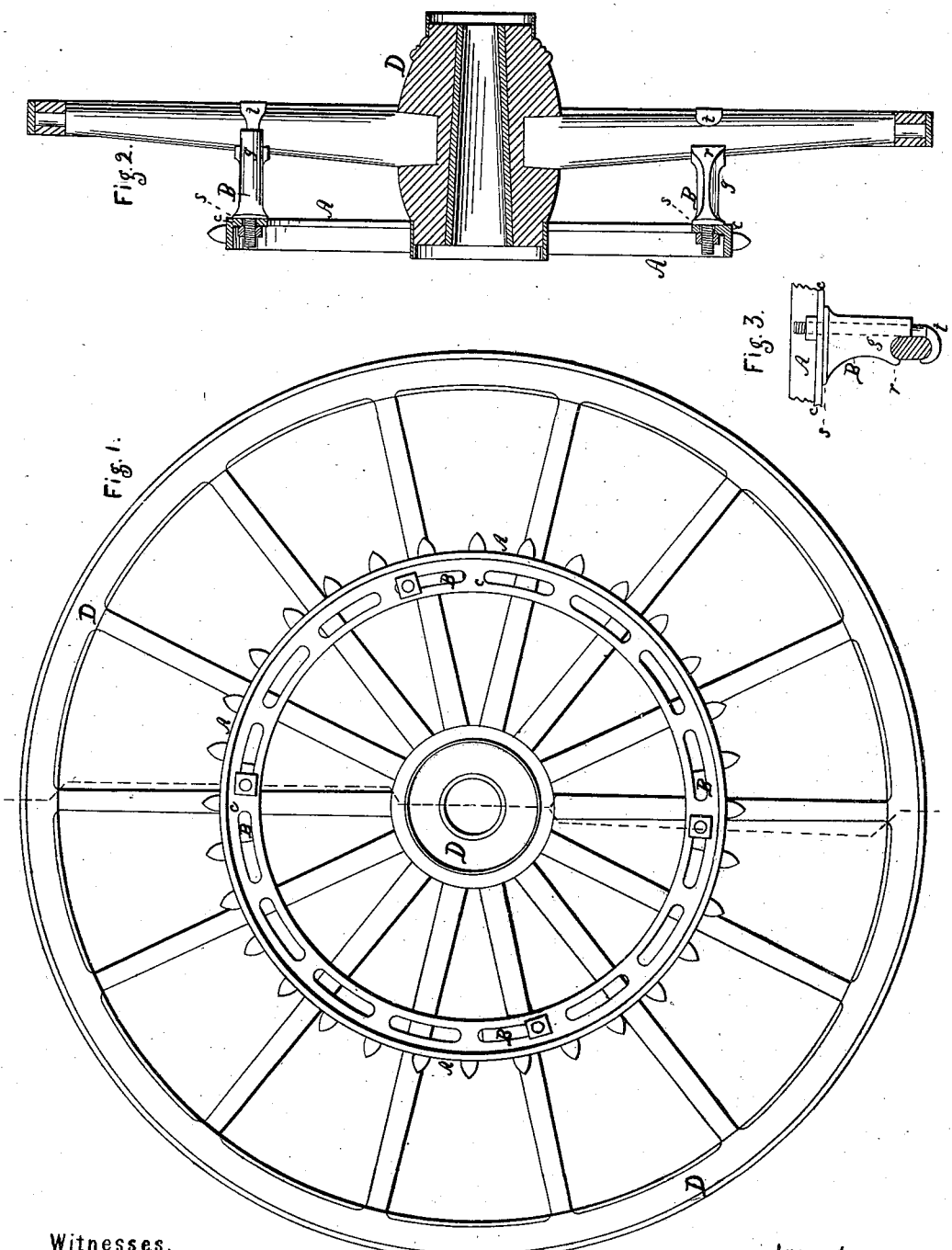

PERLEY D. CUMMINGS, OF PORTLAND, MAINE, ASSIGNOR TO D. H. FURBISH, OF SAME PLACE.

GEARING.

Specification of Letters Patent No. 28,631, dated June 5, 1860.

*To all whom it may concern:*

Be it known that I, PERLEY D. CUMMINGS, of Portland, in the county of Cumberland and State of Maine, have invented certain new and useful Improvements in Gearing, and that I have assigned all my right, title, and interest in the said invention to Dependence H. Furbish, of Portland, aforesaid; and I do hereby declare that the following is a full, clear, and exact description of my said invention, reference being had to the accompanying drawing, in which—

Figure 1 represents a side view of a wagon wheel with a sprocket wheel secured thereto in the manner invented by me, and Fig. 2 is a sectional view of the same following the line $x$ $x$ of Fig. 1; Fig. 3 is a side view of one of the reversible standards with portions of the sprocket wheel and of the wagon wheel spoke in section.

At the present day many agricultural machines are mounted upon wheel carriages and their operating parts are caused to move by means of chains belts or cords set in motion by the revolution of one or more of the carriage wheels as they turn, while the carriage is progressing. In such case, the chain, belt, or cord is pased around a suitable driving wheel secured to one of the wheels of the carriage, and as farmers' wagons and carts are generally built by a special class of manufacturers without reference to their employment for the purpose of operating machines, while the agricultural machines are built by manufacturers who frequently furnish the machines without the carriages but ready to be connected with carriages, it is a matter of importance that there should be some ready means of securing the driving wheel of the machine to the wheel of an ordinary wagon or cart which will adapt itself to the peculiarities of any case which arises in ordinary practice.

The object of the present invention is to furnish such means, and it consists in a universal reversible bolt standard, by means of a series of which a suitable driving wheel can be quickly and firmly secured to the spokes of a spoke wheel of any ordinary size for farmers' use, whatever be the number or size of the spokes.

My invention consists further in the combination of the driving wheel with the universal reversible standards by means of a slotted flange through which the bolts of the standards are passed.

The invention is applicable to cog driving wheels as well as to those for chains, belts, and cords.

In the example represented in the annexed drawing, the invention is applied to a sprocket wheel A, which is cast with a slotted flange $c$, through the slots of which the bolts of the standards B are passed. In this example four standards are employed to secure the driving wheel to the wagon wheel D. Each of these standards consists of a body and bolt combined together. The body in this instance consists of a hollow trunk $g$, which has a broad foot $s$ that bears against the slotted flange of the sprocket wheel A, and a shoulder $r$, that bears against the spoke of the carriage wheel D. The shoulder is curved to adapt itself to the curvature of the wheel spoke, and the head $t$ of the bolt has the form of a hook to fit the opposite side of the spoke. The shank of the bolt passes through the slotted flange of the driving wheel and is fitted with a screw nut by turning which the spoke, standard, and driving wheel are all firmly clamped together. As the shoulder projects from one side of the standard, the latter may be applied to the spoke with its trunk either to the right side or left side of the spoke; or in other words, it may be reversed upon the spoke. This mode of construction adapts the standards to the fastening of driving wheels to spoke wheels of any number of spokes, because if, from the position of the spokes relatively to the bars of the slotted flange of the driving wheel, any of these bars should be in the way of the bolts of the standards when applied in one direction to the spokes, the turning of any standard half around shifts the position of its bolt from one side of the spoke to the opposite thereof, thus changing its position in the slotted flange and avoiding the bar thereof. The length of thread on the bolt is made sufficient to admit the largest spokes in ordinary use between the hook head of the bolt and the shoulder of the trunk, and the greater or less distance to which the nut is screwed on adapts the standards to spokes of smaller size.

My universal reversible bolt standard may be varied in construction without ceasing to embody my invention; thus for example, the hook head of the bolt may be replaced by a plate of suitable form through which the bolt is passed, but such construction would be less advantageous than that represented in the drawings. The bolt might also be passed along by the side of the trunk instead of through it, the trunk being modified to suit this change. Moreover the slotted flange of the driving wheel need not be made continuous, but may consist of a series of short flanges separated by spaces: Or, the standards may be constructed in such manner as to grip the wheel without the necessity of a slot.

What I claim as my invention and desire to secure by Letters Patent is—

1. A universal reversible bolt standard constructed substantially as herein set forth for the purpose of securing a driving wheel to a carriage wheel.

2. The combination of the universal reversible bolt standard herein described with the driving wheel by means of a flange upon the latter substantially as described.

In testimony whereof I have hereunto subscribed my name.

PERLEY D. CUMMINGS.

Witnesses:
CHAS. W. CAHOON,
CLINTON FURBISH.